(12) United States Patent
Silvi et al.

(10) Patent No.: US 6,506,871 B1
(45) Date of Patent: Jan. 14, 2003

(54) EXTRUSION METHOD FOR MAKING POLYCARBONATE

(75) Inventors: Norberto Silvi, Clifton Park, NY (US); Patrick Joseph McCloskey, Watervliet, NY (US); James Day, Scotia, NY (US); Mark Howard Giammattei, Selkirk, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/167,903

(22) Filed: Jun. 12, 2002

Related U.S. Application Data

(63) Continuation-in-part of application No. 09/911,439, filed on Jul. 24, 2001, now Pat. No. 6,420,512.

(51) Int. Cl.$^7$ .............................................. C08G 64/00
(52) U.S. Cl. ....................................... 528/196; 528/198
(58) Field of Search ................................. 528/196, 198

(56) References Cited

U.S. PATENT DOCUMENTS

| | | |
|---|---|---|
| 4,232,668 A | 11/1980 | Strupat |
| 5,696,222 A | 12/1997 | Kaneko et al. |
| 6,300,459 B1 | 10/2001 | Kaneko et al. |

FOREIGN PATENT DOCUMENTS

| | | |
|---|---|---|
| EP | 980861 | 2/2000 |
| EP | 1114841 | 7/2001 |
| EP | 1191049 | 3/2002 |

*Primary Examiner*—Terressa M. Boykin
(74) *Attorney, Agent, or Firm*—Andrew J. Caruso; Noreen C. Johnson

(57) ABSTRACT

Extrusion of a mixture of an ester-substituted diaryl carbonate, such as bis(methyl salicyl) carbonate, a dihydroxy aromatic compound such as bisphenol A and a transesterification catalyst such as tetrabutylphosphonium acetate (TBPA) affords polycarbonate having a weight average molecular weight of greater than 20,000 daltons. The extruder is equipped with one or more vacuum vents to remove by-product ester-substituted phenol. Similarly, a precursor polycarbonate having ester-substituted phenoxy endgroups, for example methyl salicyl endgroups, when subjected to extrusion affords a polycarbonate having a significantly increased molecular weight relative to the precursor polycarbonate. The reaction to form a higher molecular weight polycarbonate may be catalyzed by residual transesterification catalyst present in the precursor polycarbonate, or by a combination of any residual catalyst and an additional catalyst such as TBPA introduced in the extrusion step. Fries rearrangement products are not observed in the product polycarbonates.

35 Claims, 1 Drawing Sheet

EXTRUSION METHOD FOR MAKING POLYCARBONATE

RELATED APPLICATION

This application is a Continuation In Part of U.S. application Ser. No. 09/911,439, filed Jul. 24, 2001 now U.S. Pat. No. 6,420,512.

BACKGROUND OF THE INVENTION

This invention relates to a method of preparing polycarbonates using an extruder to convert component monomers, ester substituted diaryl carbonates and dihydroxyaromatic compounds, into product polycarbonates. The invention further relates to the preparation of polycarbonates in which a precursor polycarbonate comprising ester-substituted phenoxy endgroups is subjected to extrusion to produce a polycarbonate having a higher molecular weight. More particularly, the instant invention relates to the formation under mild conditions of polycarbonates having extremely low levels of Fries rearrangement products and possessing a high level of endcapping.

Polycarbonates, such as bisphenol A polycarbonate, are typically prepared either by interfacial or melt polymerization methods. The reaction of a bisphenol such as bisphenol A (BPA) with phosgene in the presence of water, a solvent such as methylene chloride, an acid acceptor such as sodium hydroxide and a phase transfer catalyst such as triethylamine is typical of the interfacial methodology. The reaction of bisphenol A with a source of carbonate units such as diphenyl carbonate at high temperature in the presence of a catalyst such as sodium hydroxide is typical of currently employed melt polymerization methods. Each method is practiced on a large scale commercially and each presents significant drawbacks.

The interfacial method for making polycarbonate has several inherent disadvantages. First it is a disadvantage to operate a process which requires phosgene as a reactant due to obvious safety concerns. Second it is a disadvantage to operate a process which requires using large amounts of an organic solvent because expensive precautions must be taken to guard against any adverse environmental impact. Third, the interfacial method requires a relatively large amount of equipment and capital investment. Fourth, the polycarbonate produced by the interfacial process is prone to having inconsistent color, higher levels of particulates, and higher chloride content, which can cause corrosion.

The melt method, although obviating the need for phosgene or a solvent such as methylene chloride requires high temperatures and relatively long reaction times. As a result, by-products may be formed at high temperature, such as the products arising by Fries rearrangement of carbonate units along the growing polymer chains. Fries rearrangement gives rise to undesired and uncontrolled polymer branching which may negatively impact the polymer's flow properties and performance. The melt method further requires the use of complex processing equipment capable of operation at high temperature and low pressure, and capable of efficient agitation of the highly viscous polymer melt during the relatively long reaction times required to achieve high molecular weight.

Some years ago, it was reported in U.S. Pat. No. 4,323, 668 that polycarbonate could be formed under relatively mild conditions by reacting a bisphenol such as BPA with the diaryl carbonate formed by reaction phosgene with methyl salicylate. The method used relatively high levels of transesterification catalysts such as lithium stearate in order to achieve high molecular weight polycarbonate. High catalyst loadings are particularly undesirable in melt polycarbonate reactions since the catalyst remains in the product polycarbonate following the reaction. The presence of a transesterification catalyst in the polycarbonate may shorten the useful life span of articles made therefrom by promoting increased water absorption, polymer degradation at high temperatures and discoloration.

It would be desirable, therefore, to minimize the amount of catalyst required in the melt preparation of polycarbonate from bisphenols and ester substituted diaryl carbonates such as bis(methyl salicyl) carbonate (BMSC). In addition, it would be desirable to provide a method for the melt preparation of polycarbonate using simple melt mixing equipment such as an extruder.

BRIEF SUMMARY OF THE INVENTION

The present invention provides a method for the preparation of polycarbonate, said method comprising extruding at one or more temperatures in a temperature range and at one or more screw speeds in a screw speed range in the presence of a transesterification catalyst, at least one starting material selected from the group consisting of (A) a solid mixture comprising an ester-substituted diaryl carbonate and at least one dihydroxy aromatic compound; and (B) at least one precursor polycarbonate comprising ester-substituted phenoxy terminal groups.

The present invention further relates to a single step method for preparing highly endcapped, polycarbonates having very low levels of Fries rearrangement products, said polycarbonates comprising ester substituted phenoxy endgroups.

DETAILED DESCRIPTION OF THE INVENTION

Figure 1:
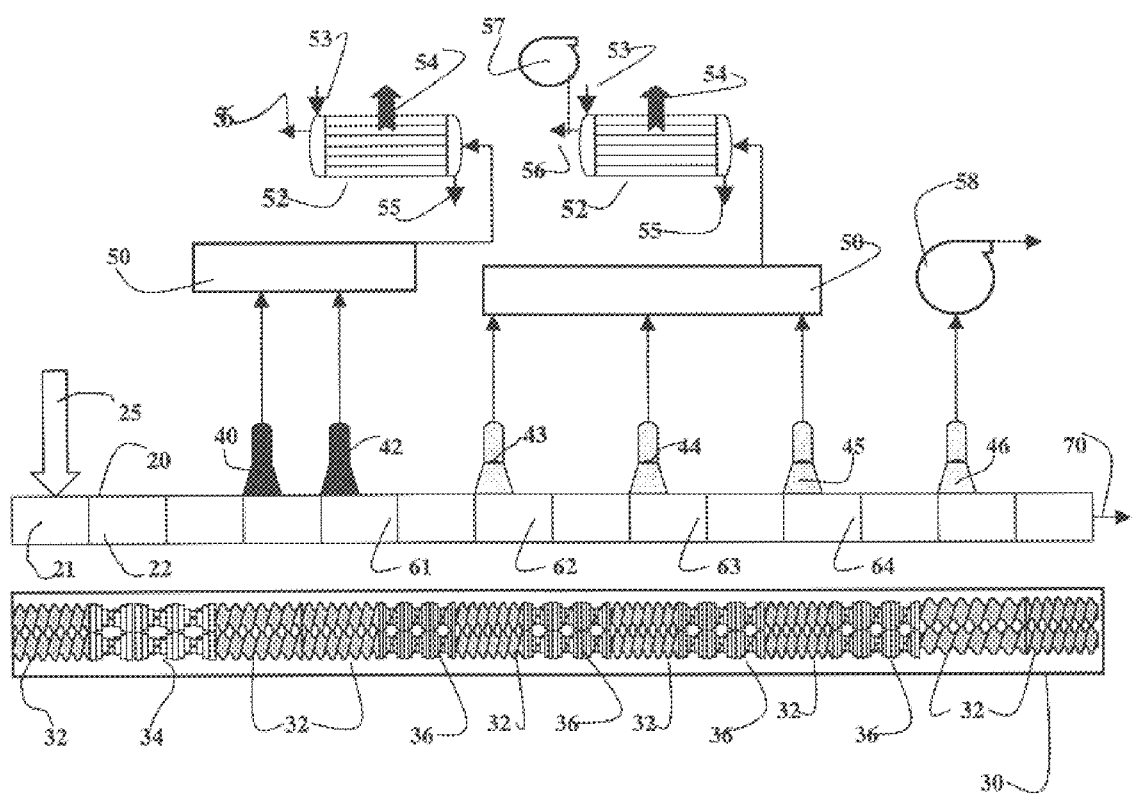
FIG. 1 shows a 14 barreled, vented extruder together with its screw design which may be used in practicing the invention.

The present invention may be understood more readily by reference to the following detailed description of preferred embodiments of the invention and the examples included therein. In the following specification and the claims which follow, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein the term "polycarbonate" refers to polycarbonates incorporating structural units derived from one or more dihydroxy aromatic compounds and includes copolycarbonates and polyestercarbonates.

As used herein, the term "melt polycarbonate" refers to a polycarbonate made by the transesterification of a diaryl carbonate with a dihydroxy aromatic compound.

As used herein the term "precursor polycarbonate" refers to a polycarbonate which when subjected to extrusion in the presence of a transesterification catalyst affords a polycarbonate having a higher molecular weight after the extrusion than before it.

"BPA" is herein defined as bisphenol A or 2,2-bis(4-hydroxyphenyl)propane.

"Catalyst system" as used herein refers to the catalyst or catalysts that catalyze the transesterification of the bisphenol with the diaryl carbonate in the melt process.

"Catalytically effective amount" refers to the amount of the catalyst at which catalytic performance is exhibited.

As used herein the term "Fries product" is defined as a structural unit of the product polycarbonate which upon hydrolysis of the product polycarbonate affords a carboxy-substituted dihydroxy aromatic compound bearing a carboxy group adjacent to one or both of the hydroxy groups of said carboxy-substituted dihydroxy aromatic compound. For example, in bisphenol A polycarbonate prepared by a melt reaction method in which Fries reaction occurs, the Fries product comprises structure VM below, which affords 2-carboxy bisphenol A upon complete hydrolysis of the product polycarbonate.

The terms "Fries product" and "Fries group" are used interchangeably herein.

The terms "Fries reaction" and "Fries rearrangement" are used interchangeably herein.

The terms "double screw extruder" and "twin screw extruder" are used interchangeably herein.

As used herein the term "monofunctional phenol" means a phenol comprising a single reactive hydroxy group.

The terms "vent port" and "vent" are used interchangeably herein.

As used herein the term "aliphatic radical" refers to a radical having a valence of at least one comprising a linear or branched array of atoms which is not cyclic. The array may include heteroatoms such as nitrogen, sulfur and oxygen or may be composed exclusively of carbon and hydrogen. Examples of aliphatic radicals include methyl, methylene, ethyl, ethylene, hexyl, hexamethylene and the like.

As used herein the term "aromatic radical" refers to a radical having a valence of at least one comprising at least one aromatic group. Examples of aromatic radicals include phenyl, pyridyl, furanyl, thienyl, naphthyl, phenylene, and biphenyl.

The term includes groups containing both aromatic and aliphatic components, for example a benzyl group.

As used herein the term "cycloaliphatic radical" refers to a radical having a valence of at least one comprising an array of atoms which is cyclic but which is not aromatic. The array may include heteroatoms such as nitrogen, sulfur and oxygen or may be composed exclusively of carbon and hydrogen. Examples of cycloaliphatic radicals include cyclopropyl, cyclopentyl cyclohexyl, tetrahydrofuranyl and the like.

According to the method of the present invention, extruding in the presence of a phase transfer catalyst a starting material (A), a solid mixture comprising an ester-substituted diaryl carbonate and at least one dihydroxy aromatic compound; or a starting material (B), at least one precursor polycarbonate comprising ester-substituted phenoxy terminal groups; affords a product polycarbonate. In some instances the method according to the present invention employs both starting materials (A) and (B), for example, as where an ester-substituted diaryl carbonate, a dihydroxy aromatic compound and a precursor polycarbonate comprising ester-substituted phenoxy endgroups, and a transesterification catalyst are mixed in a Henschel mixer to form a powder comprising starting materials (A) and (B), and said powder is then extruded to afford a polycarbonate.

In one aspect the of the present invention the product polycarbonate is prepared by introducing an ester substituted diaryl carbonate, at least one dihydroxy aromatic compound, and a transesterification catalyst into an extruder to form a molten mixture within said extruder in which reaction between carbonate groups and hydroxyl groups occurs giving rise to polycarbonate product and ester-substituted phenol by-product. The extruder may be equipped with vacuum vents which serve to remove the ester-substituted phenol by-product and thus drive the polymerization reaction toward completion. The molecular weight of the polycarbonate product may be controlled by controlling, among other factors, the feed rate of the reactants, the type of extruder, the extruder screw design and configuration, the residence time in the extruder, the reaction temperature and the number of vacuum vents present on the extruder and the pressure at which said vacuum vents are operated. The molecular weight of the polycarbonate product may also depend upon the structures of the reactant ester-substituted diaryl carbonate, dihydroxy aromatic compound, and transesterification catalyst employed.

The ester-substituted diaryl carbonates according to the present invention include diaryl carbonates having structure I

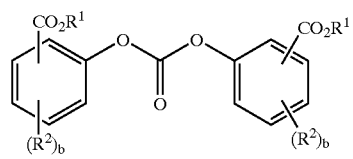

wherein $R^1$ is independently at each occurrence $C_1$–$C_{20}$ alkyl group, $C_4$–$C_{20}$ cycloalkyl group, or $C_4$–$C_{20}$ aryl group; $R^2$ is independently at each occurrence a halogen atom, cyano group, nitro group, $C_1$–$C_{20}$ alkyl group, $C_4$–$C_{20}$ cycloalkyl group, $C_4$–$C_{20}$ aryl group, $C_4$–$C_{20}$ alkoxy group, $C_4$–$C_{20}$ cycloalkoxy group, $C_4$–$C_{20}$ aryloxy group, $C_1$–$C_{20}$ alkylthio group, $C_4$–$C_{20}$ cycloalkylthio group, $C_4$–$C_{20}$ arylthio group, $C_1$–$C_{20}$ alkylsulfinyl group, $C_4$–$C_{20}$ cycloalkylsulfinyl group, $C_4$–$C_{20}$ arylsulfinyl group, $C_1$–$C_{20}$ alkylsulfonyl group, $C_4$–$C_{20}$ cycloalkylsulfonyl group, $C_4$–$C_{20}$ arylsulfonyl group, $C_1$–$C_{20}$ alkoxycarbonyl group, $C_4$–$C_{20}$ cycloalkoxycarbonyl group, $C_4$–$C_{20}$ aryloxycarbonyl group, $C_2$–$C_{60}$ alkylamino group, $C_6$–$C_{60}$ cycloalkylamino group, $C_5$–$C_{60}$ arylamino group, $C_1$–$C_{40}$ alkylaminocarbonyl group, $C_4$–$C_{40}$ cycloalkylaminocarbonyl group, $C_4$–$C_{40}$ arylaminocarbonyl group, or $C_1$–$C_{20}$ acylamino group; and b is independently at each occurrence an integer 0–4.

Ester-substituted diaryl carbonates I are exemplified by bis(methyl salicyl) carbonate (CAS Registry No. 82091-12-1), bis(ethyl salicyl) carbonate, bis(propyl salicyl) carbonate, bis(butyl salicyl) carbonate, bis(benzyl salicyl) carbonate, bis(methyl 4-chlorosalicyl) carbonate and the like. Typically bis(methyl salicyl) carbonate is preferred.

The dihydroxy aromatic compounds according to the present invention include bisphenols having structure II

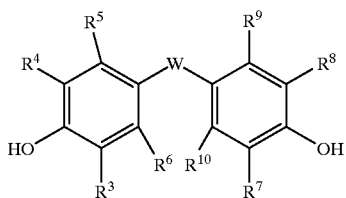

wherein $R^3$–$R^{10}$ are independently a hydrogen atom, halogen atom, nitro group, cyano group, $C_1$–$C_{20}$ alkyl group, $C_4$–$C_{20}$ cycloalkyl group, or $C_6$–$C_{20}$ aryl group; W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical, or the group,

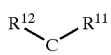

wherein $R^{11}$ and $R^{12}$ are independently a hydrogen atom, $C_1$–$C_{20}$alkyl group, $C_4$–$C_{20}$ cycloalkyl group, or $C_4$–$C_{20}$ aryl group; or $R^{11}$ and $R^{12}$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups, or a combination thereof.

Suitable bisphenols II are illustrated by 2,2-bis(4-hydroxyphenyl)propane (bisphenol A); 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4'dihydroxy-1,1-biphenyl; 4,4'-dihydroxy-3, 3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene and 1,4-bis(2-(4-hydroxy-3-methylphenyl)-2-propyl)benzene. Bisphenol A is preferred.

The polycarbonate prepared according to the method of the present invention comprises ester substituted phenoxy endgroups having structure III

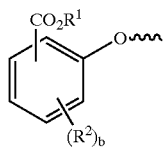

III wherein $R^1$ and $R^2$ are defined as in structure I and b is an integer 0–4; or endgroups derived from structure III, for example, endgroups introduced by displacement of an ester substituted phenoxy endgroup having structure III by a monofunctional phenol such as p-cumylphenol. In one embodiment of the present invention structure III is the methyl salicyl group IV. The methyl salicyl endgroup IV is preferred.

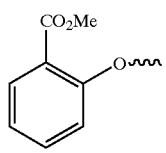

IV

The present invention provides a method for the preparation of polycarbonate, said method comprising extruding in the presence of a phase transfer catalyst at least one starting material selected from the group consisting of: (A) a solid mixture comprising an ester-substituted diaryl carbonate and at least one dihydroxy aromatic compound; and (B) at least one precursor polycarbonate comprising ester-substituted phenoxy endgroups. The extruder is operated at one or more temperatures in a temperature range, at least one of said temperatures being sufficient to promote reaction between hydroxy and carbonate groups present in the starting material, thereby effecting polymer chain growth. The method of the present invention provides the product polycarbonate as an extrudate. The reaction between hydroxy and carbonate groups is advantageously catalyzed by a transesterification catalyst. Where starting material (A) is employed the transesterification catalyst is introduced into the extruder along with the ester-substituted diaryl carbonate and at least one dihydroxy aromatic compound. Where starting material (B) is employed, a transesterification catalyst may be added in addition to the precursor polycarbonate being introduced into the extruder. Frequently, however, the precursor polycarbonate is itself prepared via a melt reaction between an ester-substituted diaryl carbonate and at least one dihydroxy aromatic compound in the presence of a transesterification catalyst. Precursor polycarbonates incorporating ester-substituted phenoxy endgroups may be conveniently prepared by heating a mixture of at least one dihydroxy aromatic compound, such as bisphenol A, with an ester-substituted diaryl carbonate, such as bis(methyl salicyl) carbonate, in the presence of transesterification catalyst, such as tetrabutylphosphonium acetate, at a temperature in a range between 150° C. and 200° C. and a pressure between about 1 mmHg and about 100 mmHg while removing by-product ester-substituted phenol, said transesterification catalyst being used in an amount corresponding to between about $1\times10^{-8}$ and $1\times10^{-3}$ moles catalyst per mole dihydroxy aromatic compound. Transesterification catalysts suitable for use in the melt preparation of precursor polycarbonates comprising ester substituted endgroups include those catalysts described herein, for example a mixture terabutylphosphonium acetate and sodium hydroxide. Such transesterification catalysts are reasonably stable under the conditions of the melt preparation of the precursor polycarbonates. Thus, the precursor polycarbonate may contain sufficient residual transesterification catalyst such that additional transesterification catalyst is often unnecessary to effect substantial molecular weight increase upon extrusion of the precursor polycarbonate. The precursor polycarbonate, starting material (B), may be introduced into the extruder in a variety of forms according to the method of the present invention, including as an amorphous powder, as a partially crystalline powder and as a melt.

The amount of transesterification catalyst present according to the method of the present invention is in a range between about $1\times10^{-8}$ and about $1\times10^{-3}$, preferably between about $1\times10^{-7}$ and about $1\times10^{-3}$, and still more preferably between about $1\times10^{-6}$ and about $5\times10^{-4}$ moles catalyst per mole dihydroxy aromatic compound employed in the case of starting material (A), or in the case of starting material (B) per mole of structural units present in the precursor polycarbonate which are derived from a dihydroxy aromatic compound. The amount of transesterification catalyst present in catalyst systems having multiple components, for example sodium hydroxide and tetrabutylphosphonium acetate, is expressed as the sum of the number of moles of each component of the catalyst system per mole dihydroxy aromatic compound in the case of starting material (A), or in the case of starting material (B) per mole of structural units present in the precursor polycarbonate which are derived from a dihydroxy aromatic compound.

In one embodiment of the present invention a precursor polycarbonate comprising repeat units V

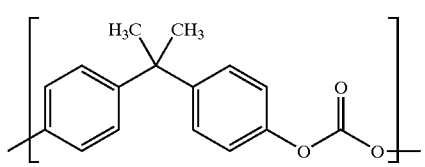

V is employed as starting material (B), wherein said precursor polycarbonate comprises residual transesterification catalyst, said catalyst being present in an amount such that the mole ratio of transesterification catalyst to bisphenol A-derived structural units V is in a range between about $1\times10^{-8}$ and about $1\times10^{-3}$, preferably between about $1\times10^{-7}$ and about $1\times10^{-3}$, and still more preferably between about $1\times10^{-6}$ and about $5\times10^{-4}$.

Suitable transesterification catalysts according to the method of the present invention include salts of alkaline earth metals, salts of alkali metals, quaternary ammonium compounds, quaternary phosphonium ions, and mixtures thereof. Suitable transesterification catalysts include quaternary ammonium compounds comprising structure VI

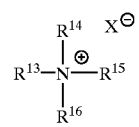

VI wherein $R^{13}-R^{16}$ are independently a $C_1-C_{20}$ alkyl group, $C_4-C_{20}$ cycloalkyl group, or a $C_4-C_{20}$ aryl group; and $X^-$ is an organic or inorganic anion. Anions $X^-$ include hydroxide, halide, carboxylate, phenoxide, sulfonate, sulfate, carbonate, and bicarbonate. In one embodiment of the present invention the transesterification catalyst comprises tetramethylammonium hydroxide.

Suitable transesterification catalysts include quaternary phosphonium compounds comprising structure VII

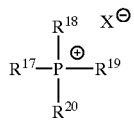

VII wherein $R^{17-R20}$ are independently a $C_1$–$C_{20}$ alkyl group, $C_4$–$C_{20}$ cycloalkyl group, or a $C_4$–$C_{20}$ aryl group; and $X^-$ is an organic or inorganic anion as defined for structure VI. In one embodiment of the present invention the transesterification catalyst comprises tetrabutylphosphonium acetate.

Where $X^-$ is a polyvalent anion such as carbonate or sulfate it is understood that the positive and negative charges in structures VI and VII are properly balanced. For example, where $R^{17}$–$R^{20}$ in structure VII are each methyl groups and $X^-$ is carbonate, it is understood that $X^-$ represents $\frac{1}{2}(CO_3^{-2})$.

The transesterification catalyst may according to the method of the present invention comprise at least one alkali metal hydroxide, alkaline earth hydroxide or mixture thereof, in addition to a quaternary ammonium compound such as VI, a quaternary phosphonium compound such as VII, or a mixture thereof. Sodium hydroxide in combination with tetrabutylphosphonium acetate illustrates such mixed catalyst systems. In catalyst systems comprising quaternary "onium" compounds such as VI or VII together with a metal hydroxide such as sodium hydroxide, it is frequently preferred that the amount of "onium" compound be present in excess relative to the metal hydroxide, preferably in an amount corresponding to from about 10 to about 250 times the amount of metal hydroxide employed.

In one embodiment of the present invention the transesterification catalyst comprises at least one alkali metal salt of a carboxylic acid, an alkaline earth metal salt of a carboxylic acid or a mixture thereof. Salts of ethylene diamine tetracarboxylic acid (EDTA) have been found to be particularly effective, among them $Na_2Mg$ EDTA.

In yet another embodiment of the present invention the transesterification catalyst comprises the salt of a nonvolatile inorganic acid. By "nonvolatile" it is meant that the referenced compounds have no appreciable vapor pressure at ambient temperature and pressure. In particular, these compounds are not volatile at temperatures at which melt polymerizations of polycarbonate are typically conducted. The salts of nonvolatile acids according the present invention are alkali metal salts of phosphites; alkaline earth metal salts of phosphites; alkali metal salts of phosphates; and alkaline earth metal salts of phosphates. Suitable salts of nonvolatile acids include $NaH_2PO_3$, $NaH_2PO_4$, $Na_2HPO_4$, $KH_2PO_4$, $CsH_2PO_4$, $Cs_2HPO_4$, and mixtures thereof. In one embodiment, the salt of the nonvolatile acid is $CsH_2PO_4$. In one embodiment of the present invention the transesterification catalyst comprises both the salt of a non-volatile acid and a basic co-catalyst such as an alkali metal hydroxide. This concept is exemplified by the use of a combination of $NaH_2PO_4$ and sodium hydroxide as the transesterification catalyst.

In one embodiment of the present invention, the starting material (A) comprises between about 0.9 and about 1.25, preferably about 0.95 to about 1.05 moles of ester-substituted diaryl carbonate per mole of dihydroxy aromatic compound present in the mixture, and the amount of transesterification catalyst employed is between about $1.0 \times 10^{-8}$ to about $1 \times 10^{-3}$, preferably between about $1.0 \times 10^{-6}$ to about $5 \times 10^{-4}$ moles of transesterification catalyst per mole of dihydroxy aromatic compound present in the mixture.

The components of starting material (A); ester-substituted diaryl carbonate, at least one dihydroxy aromatic compound, a transesterification catalyst, and optionally a monofunctional phenol may be introduced into the extruder through the same or separate feed inlets and the rates of introduction of said components and said optional monofunctional phenol may be varied to control the molar ratios of the reactants and in this manner to control the physical properties of the product polycarbonate such as molecular weight and end-group identity. The method of the present invention thus allows for adjustment of the product polycarbonate molecular weight within the context of a continuous process. For example, a slight adjustment in the relative rates of introduction of ester-substituted diaryl carbonate, dihydroxy aromatic compound and optionally monofunctional phenol may be made during a continuous extrusion operation to vary slightly the molecular weight of the product polycarbonate. Conversely, substantial changes in the product polycarbonate molecular weight may be made, as in for instance a polymer grade change, by more substantial adjustment in the relative rates of introduction of ester-substituted diaryl carbonate, dihydroxy aromatic compound and optionally monofunctional phenol.

The extruder employed according to the method of the present invention is operated at one or more temperatures in a range between about 100° C. and about 400° C., preferably between about 200° C. and about 350° C.

The extruder, which may be a single screw or multiple screw extruder is operated at one or more screw speeds in a screw speed range, said range being between about 50 revolutions per minute (rpm) and about 1200 rpm, preferably between about 50 rpm and about 500 rpm. High rpm extruders are exemplified by certain classes of modem twin screw extruders.

It is a general principle of extruder operation that as the feed rate is increased a corresponding increase in the screw speed must be made in order to accommodate the additional material being fed. Moreover, the screw speed determines the residence time of whatever material is being fed to the extruder, here reactants (A) or (B) or a mixture of reactants (A) and (B) together with a transesterification catalyst. Thus the screw speed and feed rate are typically interdependent. It is useful to characterize this relationship between feed rate and screw speed as a ratio. Typically the extruder is operated such that the ratio of starting material introduced into the extruder in pounds per hour to the screw speed expressed in rpm falls within a range of from about 0.01 to about 100, preferably 0.05 to 1. For example, the ratio of feed rate to screw speed where starting material (A) and transesterification catalyst are being introduced at 1000 pounds per hour into an extruder being operated at 400 rpm is 2.5. The maximum and minimum feed rates and extruder screw speeds are determined by, among other factors, the size of the extruder, the general rule being the larger the extruder the higher the maximum and minimum feed rates.

As mentioned, the extruder may be equipped with one or more vacuum vents. A vacuum vent is necessary in instances where a large amount of ester substituted phenol by-product is evolved during the extrusion, as in the case wherein starting material (A) is employed. In instances wherein the total amount of by-product ester-substituted phenol is relatively small, as in the case of the extrusion of a precursor polycarbonate comprising ester-substituted phenoxy endgroups IV, said precursor polycarbonate having substantial molecular weight, for example a weight average molecular weight of at least about 16000 daltons relative to a polycarbonate standard, the use of vacuum vents is optional. In general, however, it is found expedient to practice the method of the present invention on an extruder comprising at least one vacuum vent. Frequently it is preferred to have two or more vacuum vents. In some embodiments of the present invention 4 vacuum vents are employed. More generally, the method of the present invention utilizes an extruder equipped with a sufficient number of vacuum vents to convert the starting material to polycarbonate having the desired molecular weight. The vacuum vents are operated at reduced pressure, usually in a range between about 1 and about 700 mmHg, preferably between about 10 and about 50 mmHg.

The product polycarbonate emerges from the extruder as an extrudate which may be pelletized and dried before further use. In some instances the product polycarbonate, notwithstanding the action of the vacuum vents present in the initial extruder, may contain an amount of residual by-product ester substituted phenol in excess of a maximum amount which renders the polycarbonate unsuitable for immediate use in a particular application, for example a molding application requiring that the amount of residual ester substituted phenol be less than about 500 parts per million based on the weight of the product polycarbonate. In such instances it is possible to further reduce the level of residual ester substituted phenol present by subjecting the product polycarbonate to an additional extrusion step. Thus, the extruder into which the starting material (A) or (B) is introduced may be coupled to a second extruder, said second extruder being equipped with one or more vacuum or atmospheric vents for the removal of residual ester substituted phenol. The second extruder may be closely coupled to the initial extruder thereby avoiding any intermediate isolation and remelting steps. The use of a second extruder in this manner is especially beneficial during operation at high throughput rates where the residence time of the reactants in the initial extruder is insufficient to achieve the desired low level of residual ester substituted phenol. In addition to effecting further removal of residual ester substituted phenol by-product, the use of a second extruder frequently has the salutary effect of increasing the molecular weight of the product polycarbonate.

Extruders which may be employed according to the method of the present invention include co-rotating, intermeshing double screw extruders; counter-rotating, non-intermeshing double screw extruders; single screw reciprocating extruders, and single screw non-reciprocating extruders.

FIG. 1 illustrates one aspect of the present invention wherein a mixture of ester substituted diaryl carbonate, dihydroxy aromatic compound and transesterification catalyst is fed to a fourteen barrel, twin screw extruder 20 through feed inlet 25. The extruder barrels are indicated as the segments shown, for example barrel one is labeled 21, barrel two is labeled 22. (The remaining barrels 3–14 are not labeled.) The extruder has a screw design 30 consisting of conveying screw elements illustrated by 32 and kneading sections which include an initial kneading and melting section 34 and zones of intense mixing 36. The extruder is equipped with two atmospheric vents 40 and 42, said vents being connected to a manifold 50 for removal of volatile by-products from the polymerization reaction, chiefly ester substituted phenol vapors. Ester substituted phenol vapors and other volatile by-products are condensed in a shell and tube condenser 52 into which a coolant is introduced at condenser coolant inlet 53 and removed at condenser coolant outlet 55. Heat liberated as the volatile by-product vapors condense is indicated by the bold arrow labeled 54. The condensed volatile by-products are collected as a liquid at 56. The extruder is further equipped with four vacuum vents 43–46. Three of the vacuum vents 43, 44 and 45 are connected to a manifold and condenser system identical to that connected to atmospheric vents 40 and 42 with the exception that a vacuum source 57 is attached downstream of the condenser. Suitable vacuum sources 57 include an attachment to a "house" vacuum line, a water aspirator, or a dedicated vacuum pump. The fourth vacuum vent 46 is attached to a dedicated vacuum pump 58. As mentioned the extruder comprises four kneading sections which provide for intense mixing of the contents of the extruder. These zones are indicated in the screw design 30 as the kneading sections labeled 36. The kneading sections 36 in the screw design 30 correspond to reaction zones 61–64 of the extruder, said reaction zones providing for enhanced reaction rates between the hydroxyl groups of the starting dihydroxy aromatic compound and growing polymer chains with the ester substituted phenoxy carbonyl groups of the starting diaryl carbonate and growing polymer chains. The rates of reactions taking place in reaction zones 61–64, zones of intense mixing, are expected to be higher than the corresponding reaction rates in the conveying sections 32 of the extruder. The product polycarbonate emerges from the extruder as a polymer strand 70. Vacuum vents 43–46 located immediately downstream of each of the reaction zones 61–64 serve to remove the ester substituted phenol by-product formed in the reaction zones and thereby drive the polymerization reaction toward completion.

In one embodiment of the present invention the mixture introduced into the extruder further comprises a chainstopper. The chainstopper may be included with starting material (A) or starting material (B) or a mixture thereof, and can be used to limit the molecular weight of the product polymer or alter its physical properties such as glass transition temperature or static charge carrying properties. Suitable chainstoppers include monofunctional phenols, for example p-cumylphenol; 2,6-xylenol; 4-t-butylphenol; p-cresol; 1-naphthol; 2-naphthol; cardanol; 3,5-di-t-butylphenol, p-nonylphenol; p-octadecylphenol; and phenol. In alternative embodiments of the present invention the monofunctional phenol may be added at an intermediate stage of the polymerization or after its completion, as where the monofunctional phenol is added downstream of the feed inlet used to introduce starting materials (A) or (B). In such alternative embodiments the chainstopper may exert a controlling effect upon the molecular weight of the product polycarbonate and will control the identity of the polymer terminal groups.

The method of the present invention provides a product polycarbonate having a weight average molecular weight, as determined by gel permeation chromatography, in a range between about 10,000 and about 100,000 daltons, preferably between about 15,000 and about 60,000 daltons, and still more preferably between about 15,000 and about 50,000 daltons; said product polycarbonate having less than about 1000, preferably less than about 500, and still more preferably less than about 100 parts per million (ppm) Fries product. Structure VIHI below illustrates the Fries product structure present in a polycarbonate prepared from bisphenol A. As indicated, the Fries product may serve as a site for polymer branching, the wavy lines of structure VII indicating polymer chain structure.

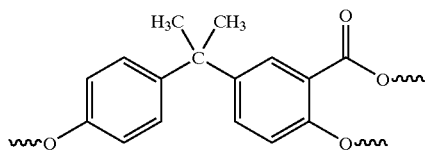

VIII

Polycarbonates prepared using the method of the present invention may be blended with conventional additives such as heat stabilizers, mold release agents and UV stabilizers and molded into various molded articles such as optical disks, optical lenses, automobile lamp components and the like. Further, the polycarbonates prepared using the method of the present invention may be blended with other polymeric materials, for example, other polycarbonates, polyestercarbonates, polyesters and olefin polymers such as ABS.

EXAMPLES

The following examples are set forth to provide those of ordinary skill in the art with a detailed description of how the methods claimed herein are evaluated, and are not intended to limit the scope of what the inventors regard as their invention. Unless indicated otherwise, parts are by weight, temperature is in ° C.

Molecular weights are reported as number average ($M_n$) or weight average ($M_w$) molecular weight and were determined by gel permeation chromatography (GPC) analysis, using a polycarbonate molecular weight standard to construct a broad standard calibration curve against which polymer molecular weights were determined. The temperature of the gel permeation columns was about 25° C. and the mobile phase was chloroform.

Fries content was measured by the KOH methanolysis of resin and is reported as parts per million (ppm). The Fries product content of polycarbonates was determined as follows. First, 0.50 grams of polycarbonate was dissolved in 4.0 ml of THF (containing p-terphenyl as internal standard). Next, 3.0 ml of 18% KOH in methanol was added to this solution. The resulting mixture was stirred for two hours at this temperature. Next, 1.0 ml of acetic acid was added, and the mixture was stirred for 5 minutes. Potassium acetate by-product was allowed to crystallize over 1 hour. The solid was filtered off and the resulting filtrate was analyzed for the Fries product, 2-carboxy bisphenol A, by liquid chromatography using p-terphenyl as the internal standard. No Fries product was detected in Examples 6–9, Table 3.

Examples 1–2 and Comparative Example 1

Introduction at a feed rate of between about 3 and about 6 pounds per hour of a mixture of bisphenol A, BMSC or diphenyl carbonate, and tetrabutyl-phosphonium acetate catalyst ($2.5 \times 10^{-4}$ moles catalyst per mole BPA) into the throat of a 20 mm counter-rotating non-intermeshing twin screw extruder equipped with 4 vacuum vents operated at about 25 mmHg, the extruder having zone temperatures in a range between about 260° C. and about 300° C., the extruder being operated at a screw speed in a range between about 50 and about 350 rpm, afforded polycarbonate having substantial molecular weight when BMSC was employed. The ratio of diaryl carbonate (DPC or BMSC) to BPA, "DAC/BPA", is given in Table 1 and represents the molar ratio of diaryl carbonate to BPA employed. "%EC" represents the percentage of product polycarbonate endgroups which are not hydroxyl groups and "Tg° C." is the glass transition temperature in degrees centigrade. The designation "CE-1" means Comparative Example 1. Data are provided for Examples 1 and 2 in Table 1 which illustrate an embodiment of the method of the present invention. In Examples 1 and 2 polycarbonate having weight average molecular weights in excess of 20,000 daltons is obtained. Comparative Example 1 illustrates the result obtained when the diaryl carbonate employed is diphenyl carbonate. The use of diphenyl carbonate affords only low molecular weight oligomeric material and substantial amounts of feed input is lost at the vacuum vents due to the persistence of unreacted diphenyl carbonate and bisphenol A.

TABLE 1

DIRECT POLYMERIZATION OF BISPHENOL A AND BMSC

| Example | DAC/BPA | Mw | Mn | % EC | Tg ° C. |
|---|---|---|---|---|---|
| Example 1 | 1.017 | 21489 | 9410 | 96.3 | 147 |
| Example 2 | 1.017 | 23789 | 9937 | 76.2 | |
| CE-1 | 1.08 | 2369 | 1797 | | 115 |

In addition to the process illustrated by Examples 1 and 2, the present invention provides for the preparation of polycarbonate in a two step process wherein an ester-substituted diaryl carbonate is first melt reacted with at least one dihydroxy aromatic compound to give a precursor polycarbonate having a reduced molecular weight. The precursor polycarbonate is then extruded to afford a substantially higher molecular weight polycarbonate. These aspects of the present invention are illustrated by Examples 3–5.

The precursor polycarbonates of Examples 3–5 were prepared by the melt reaction of BMSC and BPA in the presence of the catalysts tetrabutyl-phosphonium acetate and disodium magnesium ethylenediamine tetraacetate. The melt polymerization reaction of Example 5 was carried out in the presence of 5.07 mole percent p-cumylphenol. The melt polymerization reactions were carried out as follows: Partially crystalline precursor polycarbonates were made in a 4 L glass reaction vessel adapted for distillation under reduced pressure. The reaction vessel was equipped with a stainless steel agitator, a water cooled condenser and chilled, graduated receiving flask. Prior to its use the reaction vessel was rinsed with concentrated sulfuric acid and then deionized water (18-Mohm) until the rinse was neutral. The reaction vessel was then dried over night in a drying oven. The reaction vessel was heated by means of an electric heating mantle equipped with PID temperature controllers. The temperature of the mantle was measured at the mantle-reaction vessel interface. The pressure inside the reaction vessel was controlled by means of a vacuum pump.

The reaction vessel was charged at ambient temperature and pressure with solid bisphenol A (General Electric Plastics Japan Ltd., 4.976 mol) and solid -bis(methyl salicyl) carbonate (5.064 mol) and optionally monofunctional phenol endcapping agent. The catalyst tetrabutylphosphonium acetate ($2.5 \times 10^{-4}$ mole/mole BPA) and co-catalyst EDTA MgNa2 ($1.0 \times 10^{-6}$ mole/mole BPA) were added as aqueous solutions and the reaction vessel was assembled. The reaction vessel was then evacuated briefly and nitrogen was reintroduced. This step was repeated three times. The reaction vessel was then heated to 190° C. and the pressure lowered to less than about 10 mmHg. After 20 minutes the reactants were sufficiently melted to allow for stirring. Once distillation began, the temperature was reduced to 170° C. These conditions were maintained until about 25 percent of the target distillate had been collected. The pressure was then increased to between 30 and 40 mmHg. Within 30 minutes the contents of the reaction vessel turned white and once 30% of the theoretical amount distillate had been collected the mantle heater was turned off and the pressure increased to 500 mmHg. The oligomers were left to cool overnight before being collected and ground for extrusion. Table 2 provides data for precursor polycarbonates prepared by this method. No Fries rearrangement products could be detected in the precursor polycarbonates prepared in Examples 3–5. The column heading "%ESEG" indicates the percent of the precursor polycarbonate endgroups which are "ester-substituted endgroups" having structure III.

TABLE 2

MELT PREPARATION OF PRECURSOR POLYCARBOMNATES

| Example | DAC/BPA | Mw | Mn | % EC | % ESEG |
|---|---|---|---|---|---|
| Example 3 | 1.017 | 16566 | 7592 | 75 | 75% |
| Example 4 | 1.017 | 16784 | 7519 | 75 | 75% |
| Example 5 | 1.017 | 14022 | 6774 | 66 | 33% |

The partially crystalline precursor polycarbonates prepared in Examples 3–5 were divided into batches and ground to a powder in a Henschel mixer. Additional tetrabutylphosphonium acetate (TBPA) catalyst, 150 ppm based upon the total weight of the precursor polycarbonate, was added to one of the batches (See Example 9) during grinding in the Henschel mixer. Otherwise, the only catalyst present during the extrusion was the residual catalyst remaining in the precursor polycarbonates from the melt polymerization reaction used to form the precursor polycarbonates. In Comparative Example No. 2 the precursor polycarbonate was amorphous and was prepared by the melt reaction of diphenyl carbonate with bisphenol A. The precursor polycarbonates were then introduced at a feed rate of 3–6 pounds per hour into the throat of a 20 mm twin screw extruder equipped with 2 to 4 vacuum vents operated at about 25 mmHg and the extruder having zone temperatures between about 260° C. and about 300° C. The extruder was operated at a screw speed of about 350 rpm. The polycarbonate emerging from the extruder was found to possess substantially increased molecular weight relative to the precursor polycarbonate produced in the melt reaction. Data for the product polycarbonates are provided in Table 3.

TABLE 3

CONVERSION OF PRECURSOR POLYCARBONATES TO PRODUCT POLYCARBONATES VIA EXTRUSION

| Example | TBPA | Mw precursor | Mw product | Fries Level | [OH] | % EC |
|---|---|---|---|---|---|---|
| Example 6 | 0 | 16566 | 26820 | n.d. | 157 | 94.6 |
| Example 7 | 0 | 16566 | 32395 | n.d. | 40 | 98.4 |
| Example 8 | 0 | 16784 | 31561 | n.d. | 45 | 98.2 |
| Example 9 | 150 | 16784 | 32980 | n.d. | 38 | 98.4 |
| Example 10 | 0 | 14022 | 16852 | — | 863 | 80.2 |
| CE-2 | 0 | 6535 | 10467 | — | 813 | 75.5 |

The data in Table 3 illustrate that the method of the present invention may be used to prepare significantly higher molecular weight polycarbonates from precursor polycarbonates having lower molecular weight. The column heading "TBPA" refers to the amount of TBPA catalyst in parts per million (ppm) added to the precursor polycarbonate. The column heading "Fries Level" indicates the concentration of Fries product in the product polycarbonate. The symbol "n.d." means "not detected" and indicates the absence of Fries product. The heading "[OH]" refers to the total concentration of OH groups in the product polycarbonate. "%EC" represents the percentage of polymer chain ends not terminating in a hydroxyl group. Hydroxyl endgroup concentrations were determined by quantitative infrared spectroscopy. Monofunctional phenol and salicyl endgroup concentrations were determined by HPLC analysis after product solvolysis.

Examples 6–9 illustrate the substantial increase in molecular weight which occurs as the precursor polycarbonates incorporating ester-substituted phenoxy endgroups are subjected to extrusion. Polycarbonates possessing a substantial level of endcapping, %EC, but lacking ester-substituted phenoxy endgroups, for example the polycarbonate of Comparative Example 2, show only modest molecular weight enhancements upon extrusion. Additionally, precursor polycarbonates incorporating a substantial amount non-ester-substituted phenoxy endgroups, for example Example 10, show much more limited molecular weight enhancement upon extrusion than do precursor polycarbonates in which essentially all of the non-hydroxy endgroups are ester-substituted phenoxy groups. The data in Table 3 further illustrate that the method of the present invention allows the preparation of polycarbonate which is essentially free of Fries rearrangement product. Thus, the precursor polycarbonates can be prepared and subsequently extruded to afford high molecular weight polycarbonate without the formation of Fries rearrangement products.

Examples 11–40

Examples 11–40 were carried out on a 25 millimeter diameter, twin-screw, co-rotating, intermeshing extruder having a length to diameter ratio (LID) of about 56. The extruder was fed with powdered mixtures of starting monomers and catalyst, said powdered mixtures having been prepared by combining monomers and transesterification catalyst in a high shear mixer (Henschel mixer) to produce a powder in which the monomers and catalysts were homogeneously dispersed. The powdered mixtures consisted of bis(methyl salicyl) carbonate (BMSC), at least one bisphenol and a transesterification catalyst comprising tetrabutylphosphonium acetate (TBPA) and sodium hydroxide. The molar ratio of BMSC to bisphenol was 1.015 in all cases. (Where-more than one bisphenol was employed the ratio of BMSC to bisphenol means the ratio of the moles of BMSC employed to the total moles of all bisphenols employed.) The amounts of the two components of the transesterification catalyst were about $2.5 \times 10^{-4}$ moles TBPA per mole of bisphenol employed and about $2.0 \times 10^{-6}$ moles sodium hydroxide per mole of bisphenol employed.

The extruder included 14 segmented barrels, each barrel having a length-to-diameter ratio of about 4, and six vent ports for the removal of by-product methyl salicylate. Two of the vents (V1 and V2) were configured for operation at atmospheric pressure and four of the vents (V3, V4, V5 and V6) were configured for operation under vacuum. In practice, it was found convenient to operate the extruder with vent V2 closed. Thus, only Examples 39 and 40 were carried out with V2 open. Methyl salicylate formed as the polymerization reaction took place was collected by means of two separate condensers (shell and tube heat exchangers operated as condensers) one condenser being linked to the vents V1 and V2 and a second condenser being linked to vents V3–V6.

The extruder was operated under conditions of temperature, residence time and mixing intensity sufficient to promote polymerization reaction. The extruder screw design included conveying elements under the feed inlet and under all vents. The extruder was equipped with a series of screw kneading blocks in the upstream barrels (barrels 2 and 3) in order to melt the monomers presented to the extruder in the feed at barrel 1 and to provide mixing of the melt as the monomers in the melt began to react. The extruder also included four downstream reaction zones (Reactions Zones 1–4), each of which comprised screw kneading blocks designed to promote intense mixing of the extruder contents and reaction between hydroxy groups in the starting materials and growing polymer chains with methyl salicyl carbonate groups present in the starting BMSC and on the growing polymer chains. Each of the downstream reaction zones, located at barrels 6 (Reaction Zone 1), 8 (Reaction Zone 2), 10 (Reaction Zone 3), and 12 (Reaction Zone 4) respectively, was succeeded just downstream of the reaction zone by a vent port, said vent being operated under vacuum in order to facilitate the removal of methyl salicylate produced as a by-product in the polymerization reaction.

The reactive extrusion process of the present invention provided polycarbonates of different molecular weights depending upon the extrusion conditions employed. The extruder was operated at feed rates between about 10 and 35 pound per hour of the powdered mixture of monomers and catalyst. A "loss in weight gravity feeder" (Loss in weight gravity feeders are available from K-Tron Inc., Pitman, N.J. USA) was employed to introduce the powdered mixture of monomers and catalyst into the extruder at barrel 1. The extruder screw speed was in a range between about 70 and about 450 rpm. The melt temperature was in a range between about 290 and about 340° C., and vacuum vents were operated under a vacuum in a range between about 10 and about 25 in. of mercury (as measured on a vacuum gauge rather than a pressure gauge). Atmospheric vents V1 and V2 were configured to operate at atmospheric pressure or just slightly below atmospheric pressure by means of a Venturi device attached to the outlet of the condenser linked to V1 and V2. Polycarbonates prepared in Examples 11–40 were found to have weight average ($M_w$) molecular weights, as determined by gel permeation chromatography (GPC), of between about 15,000 and 43,000 daltons.

In Examples 11–21 the feed rate and screw speed were varied in order to identify operating conditions allowing for high feed rates while providing a product polycarbonate having a sufficiently high molecular weight to be useful. As illustrated by Example 21 in Table 4, even at a feed rate of 35 pounds per hour of the powdered mixture of starting monomers and catalyst, a reasonably high molecular weight product polycarbonate was achievable. Vent V2 was closed throughout.

TABLE 4

EXAMPLES DEMONSTRATING HIGH FEED RATES

| Example | Vacuum @ Vents (in. Hg.) | | | | | | Mass Flow Rate (lb/hr) | Torque (%) | Melt (C.) | Screw speed (rpm) | Die Pressure (psi) | Actual Barrel Temperatures (° C.) | Molecular Weight Mw/Mn/PDI |
|---|---|---|---|---|---|---|---|---|---|---|---|---|---|
| | V1 | V2 | V3 | V4 | V5 | V6 | | | | | | | |
| 11 | Atm | V | 20 | 20 | 20 | 20 | 20 | 8 | 311 | 210 | 106 | 215/268/271/319/320/322/323/323/271 | 19900/8300/2.4 |
| 12 | Atm | E | 20 | 20 | 20 | 20 | 18 | 6 | 309 | 203 | 60 | 210/271/276/322/322/320/321/321/270 | 17500/7500/2.3 |
| 13 | Atm | N | 20 | 20 | 20 | 20 | 16 | 10 | 313 | 174 | 111 | 210/271/276/321/321/320/337/333/270 | 21400/9400/2.3 |
| 14 | Atm | T | 20 | 20 | 20 | 20 | 15 | 6 | 320 | 151 | 46 | 211/271/276/320/321/320/350/348/270 | 15700/6600/2.3 |
| 15 | Atm |   | 20 | 20 | 20 | 20 | 13 | 17 | 316 | 125 | 288 | 215/271/274/320/320/320/331/330/269 | 29000/12200/2.4 |
| 16 | Atm | C | 20 | 20 | 20 | 20 | 13 | 11 | 310 | 100 | 188 | 215/270/274/320/320/328/329/270 | 22800/9600/2.4 |
| 17 | Atm | L | 20 | 20 | 20 | 20 | 22 | 9 | 319 | 206 | 135 | 206/266/272/318/319/320/329/330/271 | 21000/9200/2.3 |
| 18 | Atm | O | 20 | 20 | 20 | 20 | 24 | 8 | 317 | 206 | 120 | 202/266/271/318/319/320/329/330/270 | 20800/9100/2.3 |
| 19 | Atm | S | 20 | 20 | 20 | 20 | 28 | 6 | 316 | 206 | 84 | 198/265/270/319/320/320/330/330/270 | 19300/8500/2.3 |
| 20 | Atm | E | 20 | 20 | 20 | 20 | 28 | 7 | 320 | 299 | 74 | 196/267/272/320/320/320/330/330/270 | 18700/8400/2.2 |
| 21 | Atm | D | 20 | 20 | 20 | 20 | 35 | 5 | 316 | 299 | 46 | 193/263/270/318/319/320/330/329/269 | 16400/7000/2.3 |

Examples 22–33 were carried out in order to determine the stability of the process to make polycarbonate using the method of the present invention. In the experiment giving rise to Examples 22–33 the powdered starting material was fed to the extruder at a constant rate (13 pounds per hour) for a period of about 90 minutes. After an initial period of equilibration, the product polycarbonate emerging from the extruder was sampled every 5 minutes for a period of 60 minutes. The product polycarbonate samples were then evaluated by gel permeation chromatography. The molecular weights of the polycarbonate samples had a standard deviation equal to about 5 percent of the mean value of molecular weight obtained indicating a reasonably stable process.

TABLE 5

STABILITY OVER TIME OF THE REACTIVE EXTRUSION PROCESS

| Example | Vacuum @ Vents (in. Hg.) V1 | V2 | V3 | V4 | V5 | V6 | Mass Flow Rate (lb/hr) | Torque (%) | Melt Temperature (C.) | Screw speed (rpm) | Die Pressure (psi) | Actual Barrel Temperatures (° C.) | Mw/Mn/PDI |
|---|---|---|---|---|---|---|---|---|---|---|---|---|---|
| 22 | Atm | V | 20 | 20 | 20 | 20 | 13 | 14 | 317 | 115 | 234 | 211/268/267/322/324/330/337/336/271 | 26100/10800/2.4 |
| 23 | Atm | E | 15 | 15 | 15 | 15 | 13 | 13 | 314 | 115 | 138 | 210/269/266/320/324/330/334/333/270 | 24400/10400/2.3 |
| 24 | Atm | N | 20 | 20 | 20 | 20 | 13 | 13 | 314 | 115 | 216 | 212/270/268/323/323/330/330/331/270 | 25600/10900/2.3 |
| 25 | Atm | T | 20 | 20 | 20 | 20 | 13 | 14 | 313 | 115 | 220 | 212/270/268/322/322/322/330/329/269 | 27800/11700/2.4 |
| 26 | Atm |   | 20 | 20 | 20 | 20 | 13 | 16 | 314 | 115 | 256 | 213/270/269/321/321/330/329/330/270 | 27200/11800/2.3 |
| 27 | Atm |   | 20 | 20 | 20 | 20 | 13 | 16 | 313 | 115 | 301 | 213/271/270/320/320/330/330/330/270 | 29000/12000/2.4 |
| 28 | Atm | C | 20 | 20 | 20 | 20 | 13 | 15 | 314 | 115 | 301 | 214/270/269/320/320/330/330/330/270 | 28400/11700/2.4 |
| 29 | Atm | L | 20 | 20 | 20 | 20 | 13 | 17 | 314 | 115 | 296 | 215/270/270/320/320/330/330/330/270 | 27900/11800/2.4 |
| 30 | Atm | O | 20 | 20 | 20 | 20 | 13 | 16 | 314 | 115 | 252 | 216/270/270/320/320/330/330/330/270 | 27000/11100/2.4 |
| 31 | Atm | S | 20 | 20 | 20 | 20 | 13 | 15 | 313 | 115 | 294 | 215/270/270/320/320/330/330/330/270 | 27700/11600/2.4 |
| 32 | Atm | E | 20 | 20 | 20 | 20 | 13 | 15 | 313 | 115 | 230 | 216/270/269/320/320/330/330/330/270 | 26000/10800/2.4 |
| 33 | Atm | D | 20 | 20 | 20 | 20 | 13 | 14 | 313 | 115 | 288 | 216/270/269/320/320/330/330/330/270 | 28400/11700/2.4 |

Examples 34 and 35 illustrate the application of the method of the present invention to the preparation of copolymers. In Example 34 the powdered starting material fed to the extruder contained 20 mole percent 4,4'-dihydroxybiphenyl (biphenol) in addition to bisphenol A (BPA). The 20 mole percent refers to the percentage of the total number of moles of all bisphenols present. In Example 35 the powered starting material comprised 40 mole percent biphenol. The data gathered for the product copolycarbonates generated in Examples 34 and 35 was consistent with a copolycarbonate incorporating repeat units derived from both bisphenol A and biphenol.

TABLE 6

COPOLYCRBONATES DERIVED FROM BIPHENOL (BP) AND BPA

| Example | Vacuum @ Vents (in. Hg.) V1 | V2 | V3 | V4 | V5 | V6 | Mass Flow Rate (lb/hr) | Torque (%) | Melt Temperature (C.) | Screw speed (rpm) | Die Pressure (psi) | Actual Barrel Temperatures (° C.) | Mw/Mn/PDI |
|---|---|---|---|---|---|---|---|---|---|---|---|---|---|
| 34 | Atm |   | 15 | 15 | 18 | 15 | 12 | 5 | 308 | 84 | 41 | 218/270/364/309/310/330/331/330/270 | 22200/10300/2.1 |
| 35 | Atm |   | 20 | 20 | 20 | 20 | 13 | 4 | 307 | 94 | 38 | 229/289/279/329/330/330/330/331/271 | 13300/5800/2.3 |

Examples 37 and 38 illustrate the application of the method of the present invention to the preparation of branched polycarbonate. Example 36 represents a control containing no branching agent. In Examples 37 and 38 the branching agent 1,1,1-tris(4-hydroxyphenyl)ethane (THPE) was included in the powered starting material fed to the extruder, the amount of branching agent being 0.5 and 1.0 mole percent respectively. Mole percent THPE was based on the number of moles of THPE relative to the number of moles of BPA present in the powdered starting material. An attempt to prepare polycarbonate containing 2 mole percent THPE had to be abandoned because the excessively high viscosity of the product polycarbonate precluded its extrusion.

TABLE 7

PREPARATION OF BRANCHED POLYCARBONATE

| Example | Vacuum @ Vents (in. Hg.) | | | | | | Mass Flow Rate (lb/hr) | Torque (%) | Melt Temperature (C.) | Screw speed (rpm) | Die Pressure (psi) | Actual Barrel Temperatures (C.) | Mw/Mn/PDI |
|---|---|---|---|---|---|---|---|---|---|---|---|---|---|
| | V1 | V2 | V3 | V4 | V5 | V6 | | | | | | | |
| 36 | Atm | | 20 | 20 | 20 | 18 | 13 | 18 | 315 | 109 | 232 | 211/271/270/320/320/330/331/331/271 | 28000/11800/2.4 |
| 37 | Atm | | 20 | 20 | 20 | 22 | 18 | 28 | 323 | 118 | 646 | 205/269/270/320/320/330/331/330/270 | 39400/12700/3.1 |
| 38 | Atm | | 21 | 21 | 21 | 23 | 18 | 38 | 341 | 154 | | 204/270/270/320/320/330/330/330/290 | 43000/11700/3.7 |

Examples 39 and 40 illustrate the effect of extruding the product polycarbonate a second time and demonstrate that additional molecular weight build may be achieved by the simple expedient of performing a second extrusion on the initially prepared polymer. This second extrusion may be performed on the same extruder used in the first reactive extrusion or a second extruder which may be closely coupled to the first extruder. As noted, Examples 39 and 40 were the only Examples in the group of Examples 11–40 in which the second atmospheric vent, V2, was open. The product polycarbonate obtained in Example 39 was collected, pelletized, and later re-extruded in Example 40. A significant molecular weight increase was observed upon the second extrusion.

TABLE 8

EFFECT OF REEXTRUSION

| Example | Vacuum @ Vents (in. Hg.) | | | | | | Mass Flow Rate (lb/hr) | Torque (%) | Melt Temperature (C.) | Screw speed (rpm) | Die Pressure (psi) | Actual Barrel Temperatures (C.) | Mw/Mn/PDI |
|---|---|---|---|---|---|---|---|---|---|---|---|---|---|
| | V1 | V2 | V3 | V4 | V5 | V6 | | | | | | | |
| 39 | Atm | Atm | 10 | 10 | 10 | 25 | 20 | 40 | | 230 | 137 | 236/316/317/320/322/300/303/272 | 16100/7024/2.29 |
| 40 | Atm | Atm | 20 | 20 | 20 | 20 | 22 | 75 | 322 | 432 | 190 | 240/260/280/297/301/300/300/299/269 | 24500/10100/2.42 |

Example 41

Bisphenol A, BMSC, and a hydroxy terminated polydimethylsiloxane having a degree of polymerization of about 50 were combined and mixed in a Henschel mixer with tetrabutylphosphonium acetate (TBPA, $2.5 \times 10^{-4}$ moles per mole BPA) and sodium hydroxide ($2.0 \times 10^{-6}$ moles per mole BPA). The amount of polydimethylsiloxane employed was 5 weight percent based on the weight of BPA. The resultant powder was then fed to a 14 barrel, 25 mm diameter, counter-rotating non-intermeshing twin screw extruder configured as in Examples 11–40. The conditions under which this reactive extrusion was run and molecular weight properties of the product siloxane polycarbonate are given in Table 9. As in Examples 11–40 the vent V2 was closed throughout the reactive extrusion. The data illustrate the application of the method of the present invention to the preparation of siloxane copolycarbonates.

TABLE 9

PREPARATION OF SILOXANE COPOLYCARBONATE

| Example | Vacuum @ Vents (in. Hg.) | | | | | | Mass Flow Rate (lb/hr) | Torque (%) | Melt Temperature (C.) | Screw speed (rpm) | Die Pressure (psi) | Actual Barrel Temperatures (C.) | Mw/Mn/PDI |
|---|---|---|---|---|---|---|---|---|---|---|---|---|---|
| | V1 | V2 | V3 | V4 | V5 | V6 | | | | | | | |
| 41 | Atm | X | 19 | 19 | 19 | 19 | 15 | 6 | 307 | 107 | 38 | 208/264/242/321/301/320/313/324/271 | 18498/8078/2.29 |

Example 42

A powdered mixture of bisphenol A, bis (methyl salicyl) carbonate and transesterification catalyst is prepared as described for Examples 11–40. Thus, the powdered mixture comprises BPA and BMSC in a molar ratio of 1.015 moles of BMSC per mole of BPA. The amounts of the two components of the transesterification catalyst employed are about $2.5 \times 10^{-4}$ moles TBPA and about $2.0 \times 10^{-6}$ moles sodium hydroxide per mole of BPA present in the powdered mixture. This mixture of catalyst and starting monomers is then fed to two vented twin screw extruders operated in parallel, each of said extruders being configured as in FIG. 1. The feed rate to each extruder is essentially the same and is about 20 pounds per hour, the screw speed of each extruder is about 230 revolutions per minute, and the barrel temperatures of each extruder are essentially the same and are in a range between about 230 and about 330° C. The initial product polycarbonates emerging from the two extruders are fed directly into a third extruder, the third extruder also being configured as FIG. 1. The feed rate to the third extruder is between about 100 percent and about 150 percent of the feed rate to either the first two extruders. The third extruder is operated such that the screw speed is between about 100 and about 500 rpm, and the barrel temperatures are in a range between about 230 and about 350° C.

The invention has been described in detail with particular reference to preferred embodiments thereof, but it will be understood by those skilled in the art that variations and modifications can be effected within the spirit and scope of the invention.

What is claimed is:

1. A method for the preparation of polycarbonate comprising extruding at one or more temperatures in a temperature range between about 100° C. and about 350° C. and at one or more screw speeds in a screw speed range between about 50 and about 1200 revolutions per minute, in the presence of a transesterification catalyst at least one starting material selected from the group consisting of
   (A) a mixture comprising an ester-substituted diaryl carbonate and at least one dihydroxy aromatic compound; and
   (B) at least one precursor polycarbonate comprising ester-substituted phenoxy terminal groups;
   said extruding being carried out on an extruder having a screw speed, said starting material being introduced into said extruder at a feed rate, said feed rate and said screw speed having a ratio, said extruder being operated such that the ratio of starting material introduced into the extruder in pounds per hour to the screw speed expressed in revolutions per minute falls within a range of from about 0.01 to about 100.

2. A method according to claim 1 wherein said ester-substituted diaryl carbonate has structure I

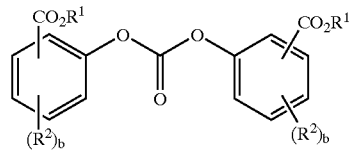

wherein $R^1$ is independently at each occurrence $C_1$–$C_{20}$ alkyl group, $C_4$–$C_{20}$ cycloalkyl group, or $C_4$–$C_{20}$ aryl group; $R^2$ is independently at each occurrence a halogen atom, cyano group, nitro group, $C_1$–$C_{20}$ alkyl group, $C_4$–$C_{20}$ cycloalkyl group, $C_4$–$C_{20}$ aryl group, $C_1$–$C_{20}$ alkoxy group, $C_4$–$C_{20}$ cycloalkoxy group, $C_4$–$C_{20}$ aryloxy group, $C_1$–$C_{20}$ alkylthio group, $C_4$–$C_{20}$ cycloalkylthio group, $C_4$–$C_{20}$ arylthio group, $C_1$–$C_{20}$ alkylsulfinyl group, $C_4$–$C_{20}$ cycloalkylsulfinyl group, $C_4$–$C_{20}$ arylsulfinyl group, $C_1$–$C_{20}$ alkylsulfonyl group, $C_4$–$C_{20}$ cycloalkylsulfonyl group, $C_4$–$C_{20}$ arylsulfonyl group, $C_1$–$C_{20}$ alkoxycarbonyl group, $C_4$–$C_{20}$ cycloalkoxycarbonyl group, $C_4$–$C_{20}$ aryloxycarbonyl group, $C_2$–$C_{60}$ alkylamino group, $C_6$–$C_{60}$ cycloalkylamino group, $C_5$–$C_{60}$ arylamino group, $C_1$–$C_{40}$ alkylaminocarbonyl group, $C_4$–$C_{40}$ cycloalkylaminocarbonyl group, $C_4$–$C_{40}$ arylaminocarbonyl group, or $C_1$–$C_{20}$ acylamino group; and b is independently at each occurrence an integer 0–4.

3. A method according to claim 2 wherein ester-substituted diaryl carbonate is selected from the group comprising bis(methyl salicyl) carbonate, bis(propyl salicyl) carbonate, and bis(benzyl salicyl) carbonate.

4. A method according to claim 1 wherein said dihydroxy aromatic compound is a bisphenol having structure II

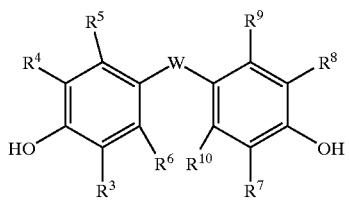

wherein $R^3$–$R^{10}$ are independently a hydrogen atom, halogen atom, nitro group, cyano group, $C_1C_{20}$ alkyl group, $C_4$–$C_{20}$ cycloalkyl group, or $C_6$–$C_{20}$ aryl group;

W is a bond, an oxygen atom, a sulfur atom, a $SO_2$ group, a $C_1$–$C_{20}$ aliphatic radical, a $C_6^{14}$ $C_{20}$ aromatic radical, a $C_6$–$C_{20}$ cycloaliphatic radical, or the group

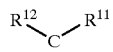

wherein $R^{11}$ and $R^{12}$ are independently a hydrogen atom, $C_1$–$C_{20}$ alkyl group, $C_4$–$C_{20}$ cycloalkyl group, or $C_4$–$C_{20}$ aryl group; or $R^{11}$ and $R^{12}$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups, or a combination thereof.

5. A method according to claim 4 wherein said bisphenol is bisphenol A.

6. A method according to claim 1 wherein said precursor polycarbonate comprises ester-substituted phenoxy terminal groups having structure III.

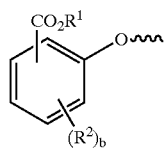

III wherein $R^1$ is a $C_1$–$C_{20}$ alkyl group, $C_4$–$C_{20}$ cycloalkyl group, or $C_4$–$C_{20}$ aryl group; $R^2$ is independently at each occurrence a halogen atom, cyano group, nitro group, $C_1$–$C_{20}$ alkyl group, $C_4$–$C_{20}$ cycloalkyl group, $C_4$–$C_{20}$ aryl group, $C_1$–$C_{20}$ alkoxy group, $C_4$–$C_{20}$ cycloalkoxy group, $C_4$–$C_{20}$ aryloxy group, $C_1$–$C_{20}$ alkylthio group, $C_4$–$C_{20}$ cycloalkylthio group, $C_4$–$C_{20}$ arylthio group, $C_1$–$C_{20}$ alkylsulfinyl group, $C_4$–$C_{20}$ cycloalkylsulfinyl group, $C_4$–$C_{20}$ arylsulfinyl group, $C_1$–$C_{20}$ alkylsulfonyl group, $C_4$–$C_{20}$ cycloalkylsulfonyl group, $C_4$–$C_{20}$ arylsulfonyl group, $C_1$–$C_{20}$ alkoxycarbonyl group, $C_4$–$C_{20}$ cycloalkoxycarbonyl group, $C_4$–$C_{20}$ aryloxycarbonyl group, $C_2$–$C_{60}$ alkylamino group, $C_6$–$C_{60}$ cycloalkylamino group, $C_5$–$C_{60}$ arylamino group, $C_1$–$C_{40}$ alkylaminocarbonyl group, $C_4$–$C_{40}$ cycloalkylaminocarbonyl group, $C_4$–$C_{40}$ arylaminocarbonyl group, or $C_1$–$C_{20}$ acylamino group; and b is an integer 0–4.

7. A method according to claim 6 wherein said precursor polycarbonate comprises ester-substituted phenoxy terminal groups having structure IV

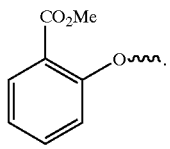

IV

8. A method according to claim 7 wherein said precursor polycarbonate is partially crystalline.

9. A method according to claim 8 wherein said precursor polycarbonate has a crystallinity of between 10 and 40 percent.

10. A method according to claim 7 wherein said precursor polycarbonate comprises bisphenol A repeat units V

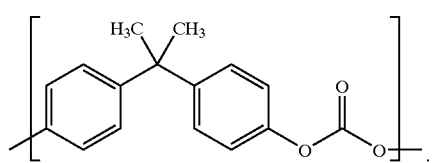

V

11. A method according to claim 1 wherein said transesterification catalyst comprises a quaternary ammonium compound, a quaternary phosphonium compound or a mixture thereof.

12. A method according to claim 11 wherein said quaternary ammonium compound has structure VI

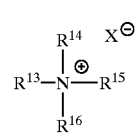

VI wherein $R^{13}$–$R^{16}$ are independently a $C_1$–$C_{20}$ alkyl group, $C_4$–$C_{20}$ cycloalkyl group, or a $C_4$–$C_{20}$ aryl group; and $X^-$ is an organic or inorganic anion.

13. A method according to claim 12 wherein said anion is selected from the group consisting of hydroxide, halide, carboxylate, phenoxide, sulfonate, sulfate, carbonate, and bicarbonate.

14. A method according to claim 12 wherein said quaternary ammonium compound is tetramethylammonium hydroxide.

15. A method according to claim 11 wherein said phosphonium compound comprises structure VII

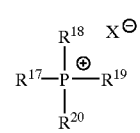

VII wherein $R^{17}$–$R^{20}$ are independently a $C_1$–$C_{20}$ alkyl group, $C_4$–$C_{20}$ cycloalkyl group, or a $C_4$–$C_{20}$ aryl group; and $X^{31}$ is an organic or inorganic anion.

16. A method according to claim 15 wherein said anion is selected from the group consisting of hydroxide, halide, carboxylate, phenoxide sulfonate, sulfate, carbonate, and bicarbonate.

17. A method according to claim 15 wherein said quaternary phosphonium compound is tetrabutylphosphonium acetate.

18. A method according to claim 11 wherein said transesterification catalyst further comprises at least one alkali metal hydroxide, alkaline earth hydroxide, or mixture thereof.

19. A method according to claim 1 wherein said transesterification catalyst comprises at least one alkali metal hydroxide, alkaline earth hydroxide, or mixture thereof.

20. A method according to claim 19 wherein said alkali metal hydroxide is sodium hydroxide.

21. A method according to claim 1 wherein said transesterification catalyst comprises at least one alkali metal salt of a carboxylic acid, or an alkaline earth salt of a carboxylic acid, or a mixture thereof.

22. A method according to claim 21 in which said alkali metal salt of a carboxylic acid is $Na_2Mg$ EDTA.

23. A method according to claim 1 wherein said transesterification catalyst comprises at least one salt of a non-volatile inorganic acid.

24. A method according to claim 23 wherein said salt of a non-volatile acid is selected from the group consisting of $NaH_2PO_3$, $NaH_2PO_4$, $Na_2HPO_4$, $KH_2PO_4$, $CsH_2PO_4$, and $Cs_2HPO_4$.

25. A method according to claim 1 wherein said mixture comprises between about 0.9 and about 1.25 moles of ester-substituted diaryl carbonate per mole of dihydroxy aromatic compound present in the mixture, and between about $1.0\times10^{-8}$ to about $1\times10^{-3}$ moles of transesterification catalyst per mole of dihydroxy aromatic compound present in the mixture.

26. A method according to claim 25 wherein said mixture comprises between about 0.95 and about 1.05 moles of ester-substituted diaryl carbonate per mole of dihydroxy aromatic compound present in the mixture, and between about $1.0\times10^{-6}$ to about $5\times10^{-4}$ moles of transesterification catalyst per mole of dihydroxy aromatic compound present in the mixture.

27. A method according to claim 1 wherein said extruding is carried out on an extruder equipped with at least one vacuum vent.

28. A method according to claim 27 wherein said extruder is selected from the group consisting of a co-rotating, intermeshing double screw extruder; a counter-rotating, non-intermeshing double screw extruder; a single screw reciprocating extruder, and a single screw non-reciprocating extruder.

29. A method according to claim 1 wherein starting materials (A) and (B) further comprise a monofunctional phenol chainstopper.

30. A method according to claim 29 wherein said chainstopper is p-cumylphenol.

31. A method according to claim 1 further comprising removing a product polycarbonate from said extruder.

32. A method according to claim 31 wherein said product polycarbonate is introduced into a second extruder at a feed rate, said second extruder having a screw speed, said feed rate and said screw speed having a ratio, said second extruder being operated at a temperature in a range between about 100° C. and about 400° C., said second extruder being operated such that the ratio of the feed rate expressed in pounds per hour to the screw speed expressed in revolutions per minute falls within a range of from about 0.01 to about 100.

33. A method according to claim 32 wherein the screw speed is in a range between about 50 and about 1200 revolutions per minute.

34. A method according to claim 1 wherein the screw speed is in a range between about 50 and about 1200 revolutions per minute.

35. A method for preparing polycarbonate comprising:

(A) extruding a mixture comprising bisphenol A, bis (methyl salicyl) carbonate and a transesterification catalyst, said mixture comprising between about 0.95 and about 1.05 moles of bis(methyl salicyl) carbonate per mole of dihydroxy aromatic compound present in the mixture, at one or more temperatures in a range between about 100° C. and about 350° C., said extruding being carried out on an extruder having a screw speed, said mixture being introduced into said extruder at a feed rate, said feed rate and said screw speed having a ratio, said extruder being operated such that the ratio of the feed rate expressed in pounds per hour to the screw speed expressed in revolutions per minute falls within a range of from about 0.01 to about 100; and (B) recovering a product polycarbonate.

* * * * *